United States Patent [19]

Rabarot et al.

[11] Patent Number: 5,734,490

[45] Date of Patent: Mar. 31, 1998

[54] MICROOPTICAL COMPONENTS AND OPTOMECHANICAL MICRODEFLECTORS WITH MICROLENS DISPLACEMENT

[75] Inventors: Marc Rabarot, Seyssinet; Engin Molva; Eric Ollier, both of Grenoble, all of France

[73] Assignee: Commissariat a l'Energie Atomique, Paris, France

[21] Appl. No.: 636,961

[22] Filed: Apr. 24, 1996

[30] Foreign Application Priority Data

May 12, 1995 [FR] France ................... 95 05652

[51] Int. Cl.⁶ .......... G02B 26/08; G02B 27/10; G02B 7/02
[52] U.S. Cl. .......... 359/210; 359/813; 359/814; 359/619
[58] Field of Search .................. 359/813, 814, 359/209, 210, 619

[56] References Cited

U.S. PATENT DOCUMENTS

| | | | |
|---|---|---|---|
| 4,170,397 | 10/1979 | Botcherby et al. | 359/210 |
| 4,385,373 | 5/1983 | Howe | 369/45 |
| 4,794,581 | 12/1988 | Andresen | 369/45 |
| 5,257,279 | 10/1993 | Dugan et al. | 372/101 |

FOREIGN PATENT DOCUMENTS

| | | |
|---|---|---|
| 0 289 449 | 11/1988 | European Pat. Off. . |
| 2 090 038 | 6/1982 | United Kingdom . |
| WO 91/06022 | 5/1991 | WIPO . |
| WO 92/02837 | 2/1992 | WIPO . |

OTHER PUBLICATIONS

Patent Abstracts of Japan, vol. 14, No. 092 (P-1009), Feb. 20, 1990, JP-A-01-300433, Dec. 4, 1989.

Optical Engineering, vol. 33, No. 11, pp. 3616-3623, Nov. 1, 1994, M. Edward Motamedi, et al., "Miniaturized Micro-Optical Scanners".

Design, Modeling, and Control of Laser Beam Optics, vol. 1625, pp. 78-83, 1992, Tom D. Milster, et al., "Modeling and Measurement of a Micro-Optic Beam Deflector".

Optical Engineering, vol. 32, No. 11, pp. 2665-2670, Nov. 1993, Edward A. Watson, "Analysis of Beam Steering with Decentered Microlens Arrays".

Primary Examiner—David C. Nelms
Assistant Examiner—Evelyn A. Lester
Attorney, Agent, or Firm—Oblon, Spivak, McClelland, Maier & Neustadt, P.C.

[57] ABSTRACT

A microoptical component including a microlens having a focal axis and a microbeam to which said microlens, is integrally fixed said microbeam extending along an axis substantially perpendicular to the focal axis of the microlens and undergoing elastic deformations along an axis substantially perpendicular to the focal axis of the microlens and to the axis along which the microbeam extends.

20 Claims, 8 Drawing Sheets

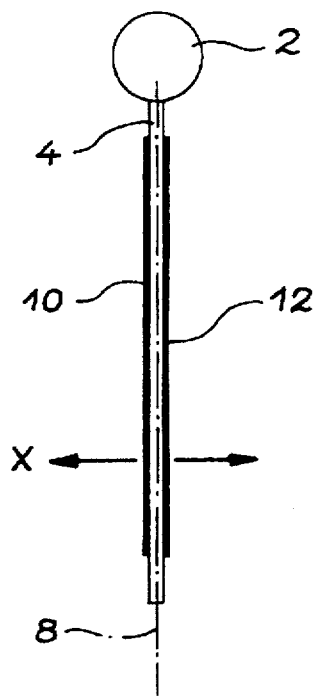
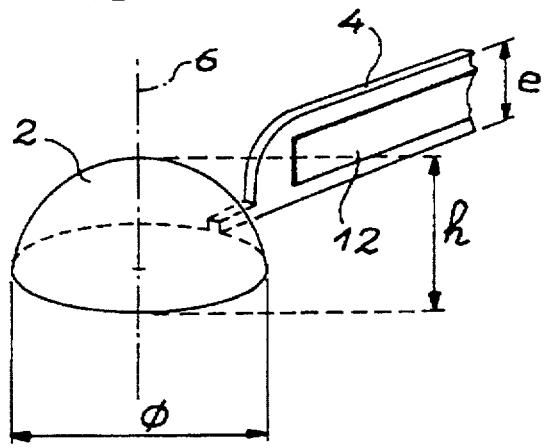
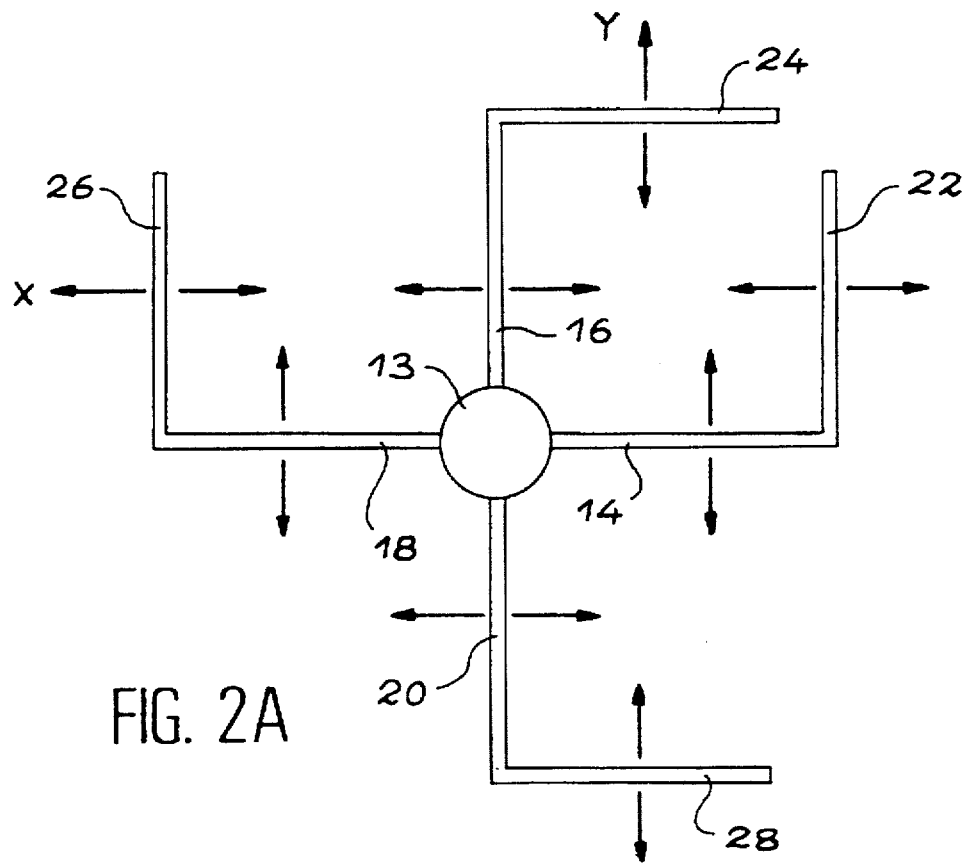
FIG. 1A
FIG. 1B
FIG. 2A

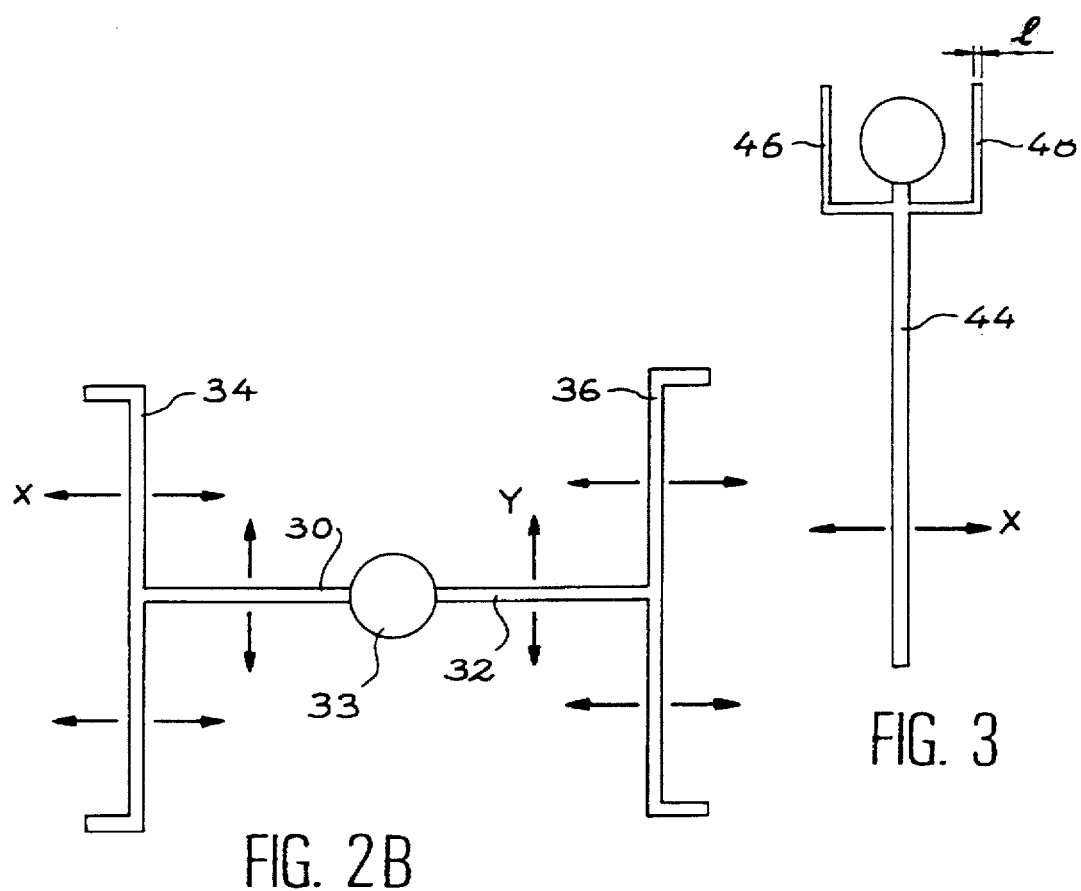
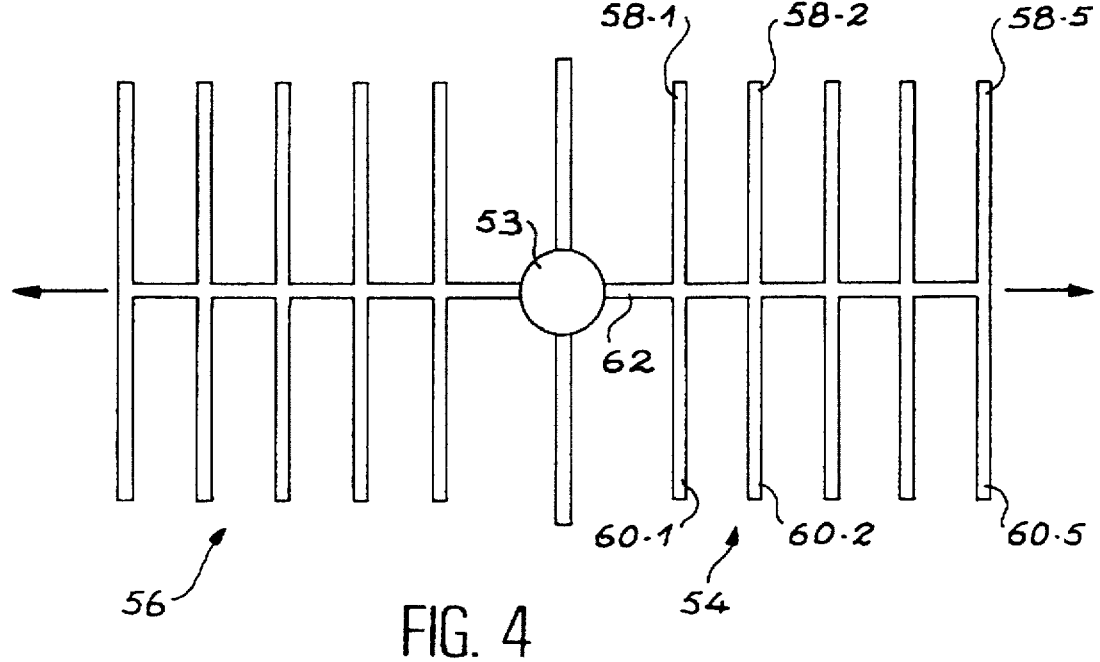

MICROOPTICAL COMPONENTS AND OPTOMECHANICAL MICRODEFLECTORS WITH MICROLENS DISPLACEMENT

TECHNICAL FIELD

The invention relates to the field of microoptical components and microtechnologies, particularly optomechanical microdeflectors, with a view to the mass production of compact microsystems. The invention is used in the field of laser microtelemeters (microlidars), optical printing systems (laser designations), optical interconnection and communications system, optical information storage systems and optical sensors.

The invention is more particularly directed at scanning applications having one or two dimensions or the deflection of a light beam from a near source with the aid of an afocal system or another combination of microlenses, whereof at least one is controlled by one or more electrostatically controlled microbeams.

STATE OF THE ART

Deflection devices using microlens arrays are e.g. described in the article by E. A. Watson entitled "Analysis of beam steering with decentered microlens array", published in OPTICAL ENGINEERING, November 1993, vol. 32, No. 11, pp 2665–2670, and in the article by T. D. Milster et al, published in SPIE, vol. 1625, "Design, Modelling and Control of Laser Beam Optics", 1992, pp 78 to 83. In the systems described in these documents use is made of the deviation caused by a misalignment of the optical axis of a mobile system of microlenses or microlens arrays.

The known laser beam microdeflector systems can also incorporate a displacement motor, such as a piezoelectric element.

However, at present, there is no microdeflector permitting a high degree of integration. The problem of advanced integration leads to another difficulty, which is that of finding components permitting such a microdeflector system integration.

The known devices have a relatively large volume and the size and weight of the components can make them sensitive to the environment, which in the case of on-board laser microtelemeters can be very problematical. This is in particular the case with torsional mirrors with respect to acceleration. Thus, the scanning principle then uses the resonance capacity of a low weight reflecting plate and per contra the plate is sensitive to external disturbances.

DESCRIPTION OF THE INVENTION

The first object of the invention is to propose basic microoptical components permitting the integration of optical systems.

The invention more particularly relates to a microoptical component comprising a microlens having a focal axis and a microbeam, to whose end is fixed the microlens, said microbeam extending along a perpendicular axis or substantially perpendicular to the focal axis of the microlens.

This microbeam can be subject to elastic deformations along an axis substantially perpendicular to the focal axis of the lens and to the axis along which the microbeam extends.

The invention also relates to a microoptical component comprising a microlens having a focal axis and a microbeam to the end of which is fixed the microlens, said microbeam extending along an axis substantially perpendicular to the focal axis of the microlens, the geometrical parameters of the microbeam being such that its sensitivity to acceleration is much higher in a plane perpendicular to the focal axis of the microlens than in the direction of said focal axis.

According to an embodiment, means are provided for the electrostatic control of the displacement of the microbeam, said means being e.g. deposited along the microbeam.

According to another aspect, such a component also has stabilization means, e.g. at least one auxiliary arm for stabilizing the microbeam.

Such a component can incorporate at least one second microbeam extending along a second axis substantially perpendicular to the focal axis of the microlens. In particular, the microlens can be fixed to the end of two microbeams.

According to a variant, one of the ends of the first microbeam is fixed to a second microbeam.

Means for the electrostatic control of the displacement of one of the second microbeams can be provided, e.g. deposited along said second microbeam. According to another aspect, the microlens is connected to at least one electrostatic microcomb.

The invention also relates to an optomechanical microdeflector incorporating a pair of microlenses, one of the microlenses being mobile and integrated into a microoptical component, as defined hereinbefore.

According to another aspect of the invention, said microdeflector has a radiation source constituted by a microlaser.

The association of a microoptical component like that described hereinbefore and a microlaser makes it possible to obtain a very high integration level, the microdeflector obtained having a very small size.

Moreover, such a device is compatible with mass production methods.

One of the lenses of the pair of microlenses can be fixed to the output face of the microlaser cavity. The pair of lenses can be of the afocal type.

BRIEF DESCRIPTION OF THE DRAWINGS

The invention is described in greater detail hereinafter relative to nonlimitative embodiments and with reference to the attached drawings, wherein show:

FIGS. 1A and 1B A first embodiment of a microoptical component according to the invention.

FIGS. 2A and 2B Two other embodiments of a microoptical component according to the invention.

FIGS. 3 and 4 Two other embodiments of a component according to the invention.

DETAILED DESCRIPTION OF EMBODIMENTS

Figure 5A:
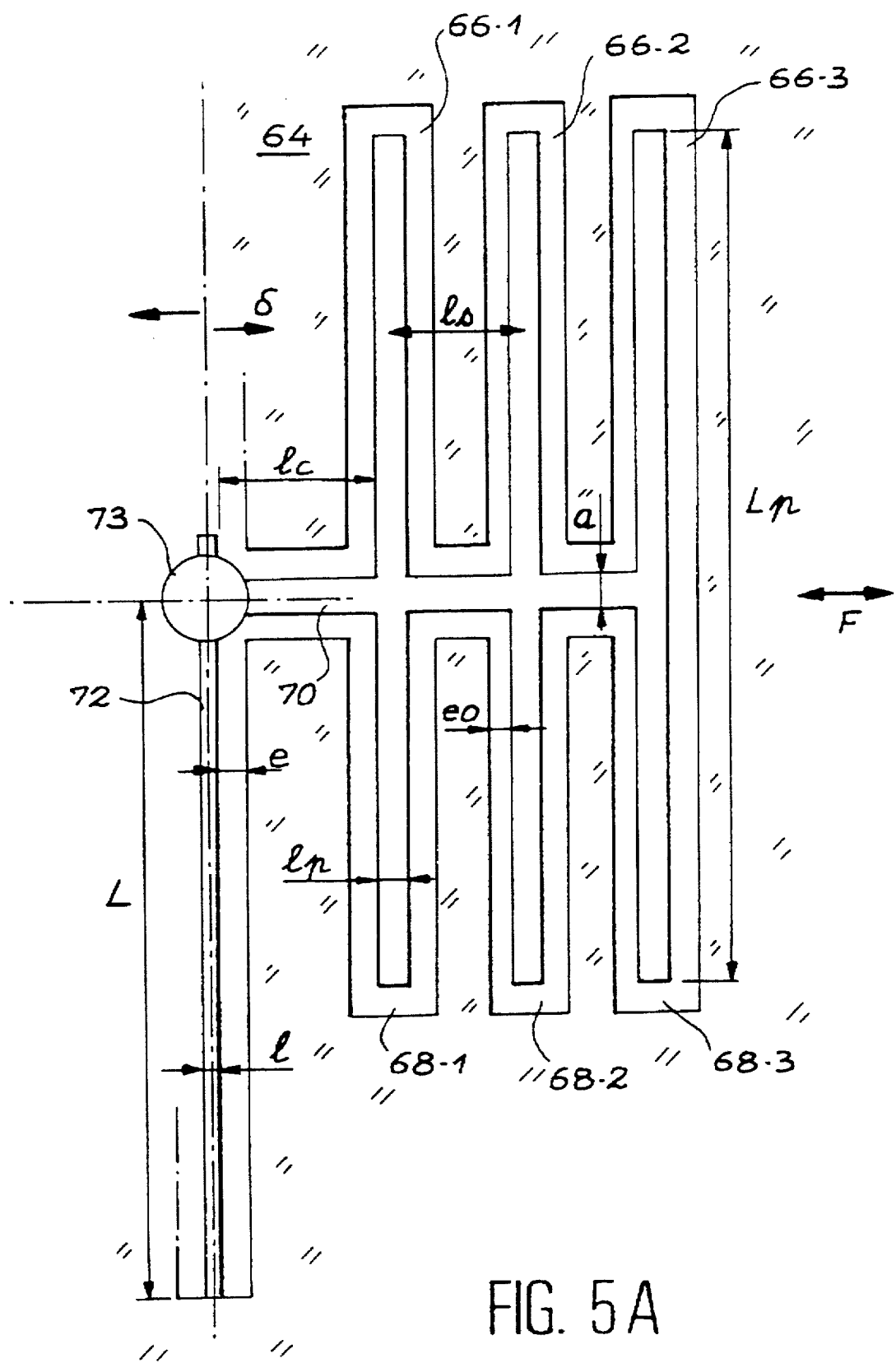
FIG. 5A An embodiment of a microoptical component showing various dimensions of concern in a comb structure.

A first embodiment of the invention is illustrated in FIGS. 1A and 1B, where reference numeral 2 designates a microlens, whose focal axis is perpendicular to the plane of FIG. 1A and is designated by the reference 6 in FIG. 1B. The microoptical component according to this first embodiment also has a microbeam 4 to which is fixed the microlens 2, said microbeam extending along an axis 8 substantially perpendicular to the microlens axis 6. Typically, for such a microcomponent, the microlens has a height h of approximately 1 micrometer (e.g. between 1 and 25 μm) and a diameter Φ of a few dozen micrometers (e.g. between 50 and 100 μm). The beam typically has a thickness e of a few micrometers to a few dozen micrometers (e.g. 25 μm), a width 1 of a few μm (e.g. approximately 5 μm) and a length of a few millimeters.

The microlens and microbeam are advantageously made from the same material, e.g. silica. According to another embodiment, metal deposits 10, 12 are made on either side of the microbeam and along the latter, said metal deposits permitting an electrostatic control of the microcomponent displacement. The displacement of such a component then only requires a low control voltage of a few dozen volts and in all cases below 100V.

The embodiment described in conjunction with FIGS. 1A and 1B is a pendular system making it possible to displace the microlens in one direction. Therefore the microbeam is an elastic system, when the electrostatic control voltage is brought to zero the microbeam returns to its initial position.

It is possible to implement more complex systems, like those illustrated in FIGS. 2A and 2B, which have several microbeams 14, 16, 18, 20, 22, 24, 26, 28 (FIG. 2A) and 30, 32, 34, 36 (FIG. 2B). In all cases, the most complex component has at least one second microbeam extending along a second axis substantially perpendicular to the focal axis of the microlens. In FIGS. 2A and 2B, the latter is perpendicular to the plane of the drawings. The microlens 13 can be fixed to the end of at least two microbeams 14, 16. Moreover, one of the ends of a microbeam 14, 16, 18, 20, 30, 32 to which is directly connected the microlens 13, 33, can itself be connected to a microbeam 22, 24, 26, 28, 34, 36, which is substantially perpendicular thereto. Each of the microbeams can be covered with a metallization deposit permitting an electrostatic displacement. Thus, it is possible to obtain a bidimensional displacement (X, Y) of a microlens 13, 33, as illustrated by the arrows in FIGS. 2A and 2B. In the said drawings are also shown a plurality of beams. However, it is clear that the teaching of the invention also covers embodiments in which e.g. only the beams 14 and 22 of FIG. 2A are present (the lens 13 being connected to the beam 14) or only the microbeams 32, 36 of FIG. 2B are present (the microlens 33 being connected to the microbeam 32), as well as any other variant having a random number of microbeams.

In addition, the microbeam generally has a symmetrical aspect with respect to its axis (reference 8 in FIG. 1A) and the metallization deposits can be made on either side of the microbeam. However, the invention also covers embodiments in which a metallization deposit is made only on one of the sides of the microbeam. The production of a metallization on each of the microbeam sides has the advantage of permitting the application of a control voltage for the electrostatic deviation of the beam, from each side thereof, which multiplies by a factor of 2 the maximum value of the deflection obtained with the same voltage.

According to another embodiment illustrated in FIG. 3 and with a view to rigidifying the main beam 44, it is possible to connect the latter to auxiliary stabilization arms 46, 48. These arms make it possible to correct a misalignment of the main beam in the direction of its thickness, i.e. in a direction perpendicular to the plane of FIG. 3. This misalignment can occur under the effect of mechanical stresses and strains and in particular those within the beam 44. This type of internal stress more particularly occurs when the beam 44 is obtained by etching a silica layer, as will be shown hereinafter. The two arms 46, 48 serve to connect the end of the beam 44 to a fixed structure.

The geometry of the compensating arms can be envisaged in different ways. However, the arms must be rigid in the vertical direction (direction perpendicular to the plane of FIG. 3) and flexible in the horizontal direction (plane of FIG. 3). It is also possible to act on the geometry of the arms by increasing the height/width form or shape factor, the height h being the height of the section of the compensating arm in a vertical cross-section (along a plane perpendicular to the plane of FIG. 3) and the width 1 being shown in FIG. 3. By acting on said form or shape factor, it is possible to obtain an adequate flexibility in the plane of FIG. 3 so as not to hinder displacements of the beam in said same plane and obtain an adequate rigidity in the perpendicular direction to limit deformations of the beam in said same direction.

In FIG. 3 each arm 46, 48 is approximately shaped like an angle bracket with two segments substantially perpendicular to one another.

According to another embodiment the arms are straight or of straight form.

Each arm can also be constituted by a U-shaped body, an arm being added to the free end and substantially perpendicular to each lateral branch of the U. The free end of one of these branches is connected to the beam 44, the free end of the other branch being connected to a fixed structure. The same applies for the second compensating arm.

In all cases it is possible to act on the height/width shape ratio of the section of each arm, so as to give it the desired rigidity in the vertical direction and the desired flexibility in the horizontal plane.

The system can also function with a single compensating arm. Nevertheless a preferred embodiment is that where the system is symmetrical in the horizontal plane (as in FIG. 3 with respect to a median plane perpendicular to the plane of FIG. 3 and passing through the axis of the beam 44). In more general terms, if the mobile part whose deformations are to be corrected has a certain spatial symmetry, it is desirable for the compensation system to have the same symmetry. This geometry avoids small lateral deformations which could appear as a result of buckling of the stabilization arms due to the fact that the silica or material constituting the mobile part is globally under compression.

Another means for rigidifying the main beam, so that there is no misalignment of the latter, is to adjust the stress of the metal deposits for making electric contacts in order to compensate the stress of the silica layer.

In order to further reduce the control voltage applied to the microdevice, the microlens 53 (cf. FIG. 4) can be connected to at least one electrostatic microcomb, designated by references 54, 56 in FIG. 4. Each comb, e.g. comb 54, is constituted by a series of teeth 58-1, 58-2, . . . , 58-5 and 60-1, 60-2, . . . 60-5 connected to a central microbeam 62. Each of these teeth carries control electrodes, e.g. arranged on either side of each of the microbeams 58, 60. As illustrated in FIG. 5A, this type of comb is inserted in a substrate 64 having notches 66-1, 66-2, 66-3 and 68-1, 68-2, 68-3 in which are inserted the comb teeth. The inner walls of the substrate notches are covered with metallization facing the metallizations deposited on the teeth of the comb, each metallization of the substrate forming with a corresponding metallization of a comb tooth a dielectric capacitor and of variable thickness. In FIG. 5A only six teeth are shown on either side of a main beam 70. This representation is not limitative and the teaching of the invention is applicable to a random number n of teeth. Using once again the notations of FIG. 5A, the lateral deviation δ of the median beam 72 (which carries the microlens 73) is given by:

$$\delta = \frac{2L^3 \epsilon L_p}{El^3} \left( \frac{V}{e_0 - \delta} \right)^2 n \qquad (1)$$

in which E represents the Young's modulus of the silica.

For the following parameter values: $E=7 \times 10^{10}$ N/m² (Pascal), L=2 mm, l=5 μm, h=25 μm, $L_p$=2 mm, l=10 μm, l=0.1 mm, a=10 μm, l=0.2 mm, $\epsilon=8.85 \times 10^{-12}$ F/m, $e_0$=100 μm, n=5, a maximum deviation of 100 μm is obtained for a medium voltage control system (equal to or below 100V) and a maximum deviation of 30 μm is obtained for a low voltage control system (equal to or below 30V), which corresponds to a deflection of approximately 12° on each side, i.e. a maximum deviation of about 25°.

In addition, a stability condition is preferably respected in order to avoid a risk of the beam electrostatically adhering when it touches a wall. This condition is: δ≦(cf. FIG. 5A for the definition of e).

In general terms, calculations show that the acceleration sensitivity is much higher in the direction parallel to the plane in which the microbeam is displaced (for a single beam it is the plane of FIG. 1A) than in the direction perpendicular to said plane and this is approximately by a factor of 30.

In order to adjust this sensitivity, it is merely necessary to adjust the geometrical parameters of the beam (thickness e, width l, for a particular beam length L).

In the case of a single beam (without teeth and without auxiliary stabilization arms) said sensitivity is broken down into:

sensitivity in the displacement plane: S//=0.034 μm/ms⁻², sensitivity perpendicular to said plane: S+=0.001 μm/ms⁻².

These values are relatively low and only induce a parasitic deflection of approximately 0.15° for a 1 g acceleration in the direction parallel to the beam plane.

Therefore, a component according to the invention, e.g. as described hereinbefore in conjunction with one of the FIGS. 1A to 5A, has a reduced environmental sensitivity compared with the prior art components.

Figure 5B:
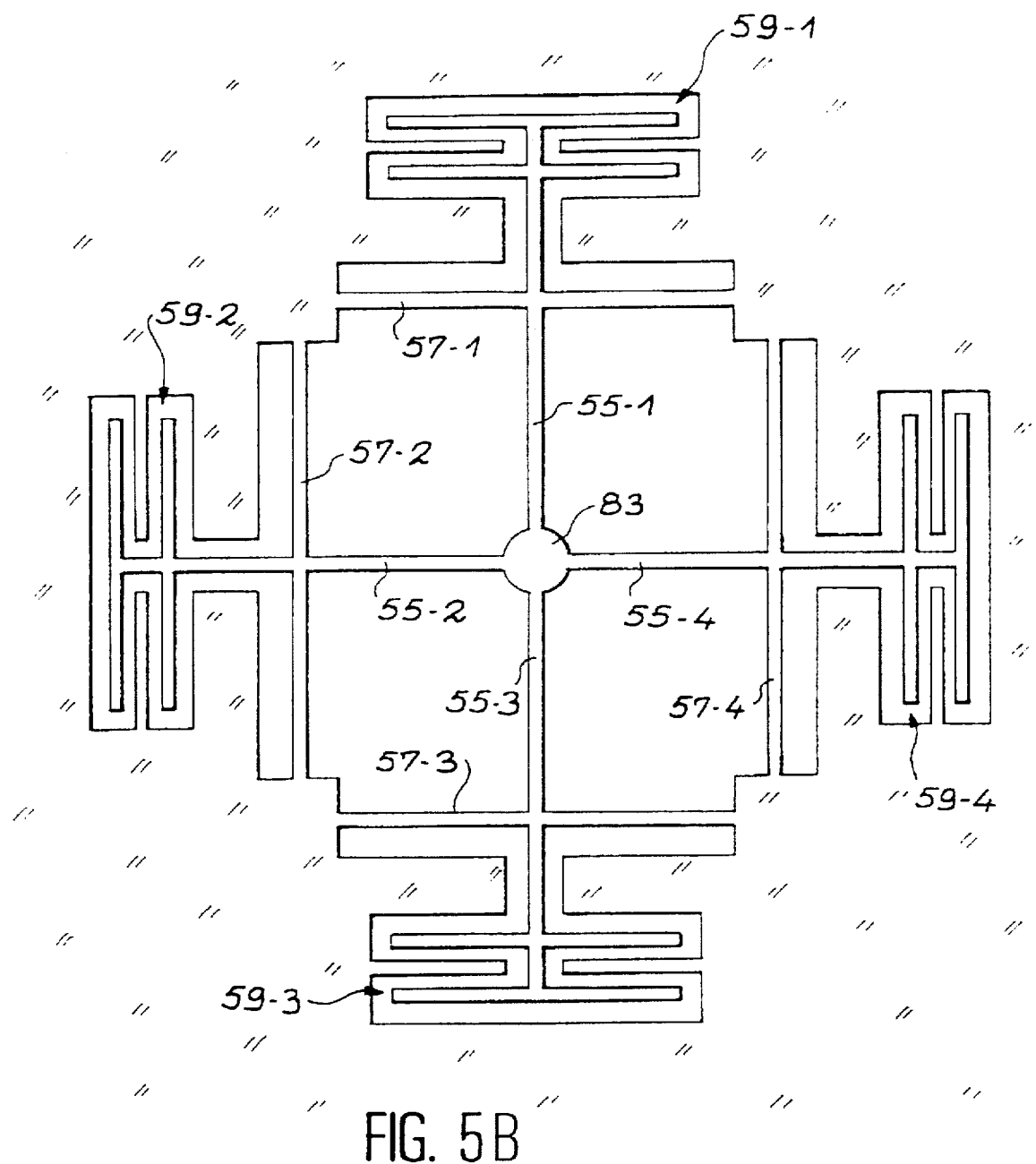
FIGS. 5B to 5D Other embodiments of a microoptical component according to the invention with an electrostatic comb.

FIG. 5B is an embodiment in which the microlens 83 is formed at the end of four microbeams 55-1, 55-2, 55-3, 55-4. Each of these microbeams is extended by an electrostatic comb 59-1, . . . 59-4 and the assembly is connected to the substrate by transverse microbeams 57-1, . . . , 57-4 extending along an axis perpendicular to the microlens axis. Each of these transverse microbeams can deform elastically when a deflection is imposed by the corresponding electrostatic comb.

This structure, e.g. made from $SiO_2$, avoids slight deformations of the combs (e.g. slight inclinations of the mobile combs relative to the fixed combs). Thus, it reduces short-circuiting risks by contact between the types of combs. It also makes it possible to reduce parasitic movements of the lens in the direction perpendicular to the force applied. Finally, said structure is less sensitive to accelerations to which it is exposed.

Figure 5C:
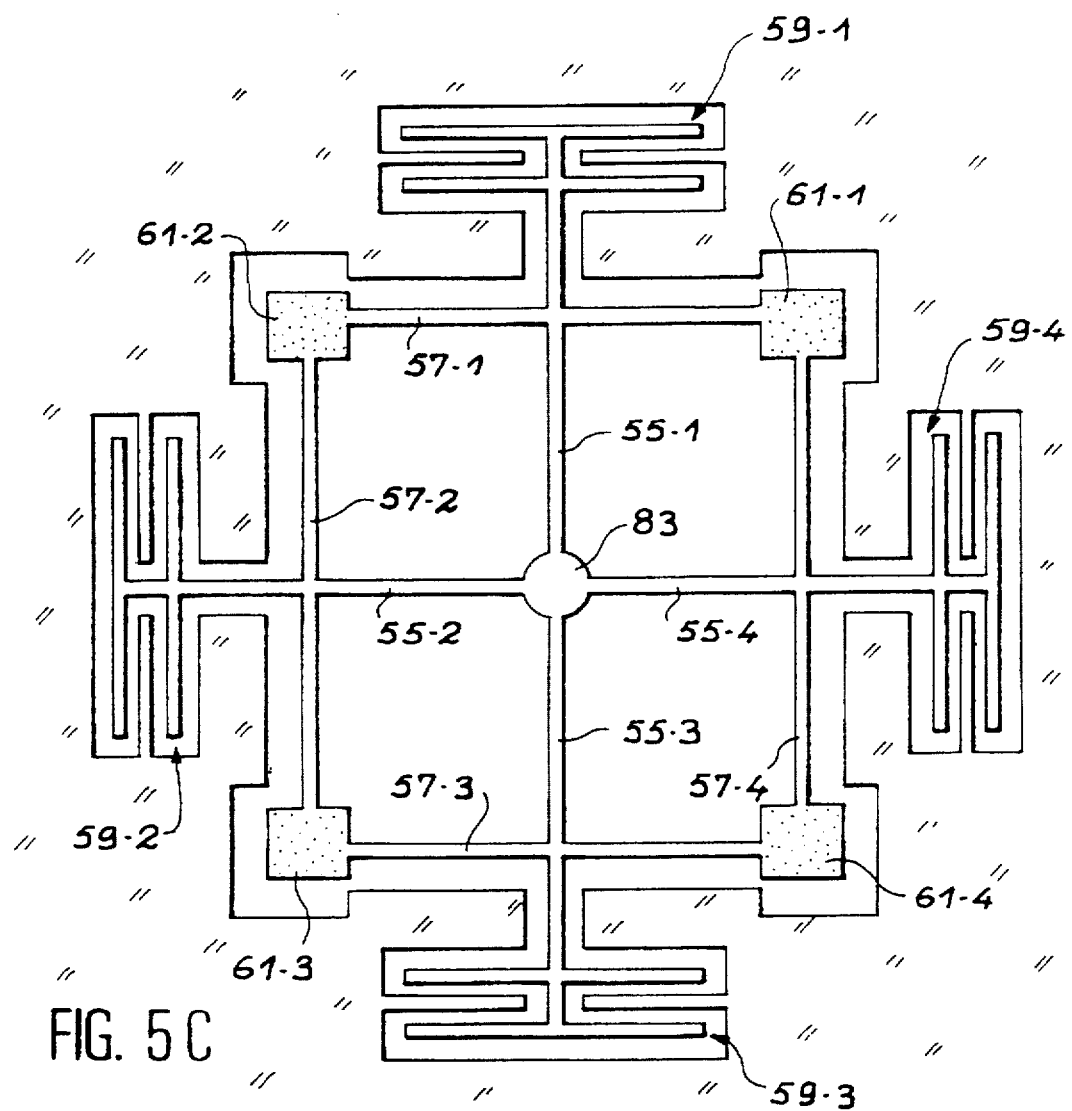

FIG. 5C illustrates a variant of the device of FIG. 5B, in which the transverse microbeams 57-1, . . . 57-4 are not directly connected to the substrate, but instead to fixed anchoring elements 61-1, . . . , 61-4. The complete device can be formed from doped silicon, in order to make it conductive, only the elements 61-1, . . . 61-4 being insulating.

Therefore the mobile part is insulated from the fixed remainder of the component, which permits the application of electrostatic forces using the doped Si of the mobile part and the fixed part, without it being necessary in this case to deposit electrodes, as in the preceding cases.

Figure 5D:
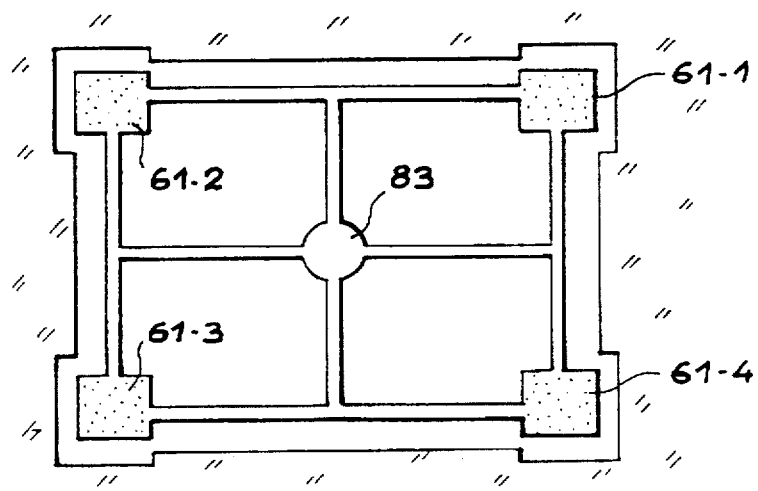

FIG. 5D illustrates a simplified device where the aforementioned comb is reduced to one face.

Figure 6A:
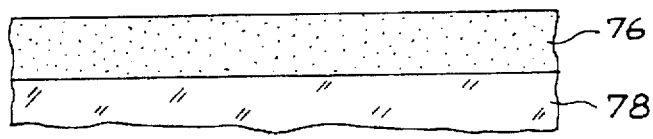
FIGS. 6A to 6F Stages in the manufacture of microoptical components according to the invention.
Figure 6B:
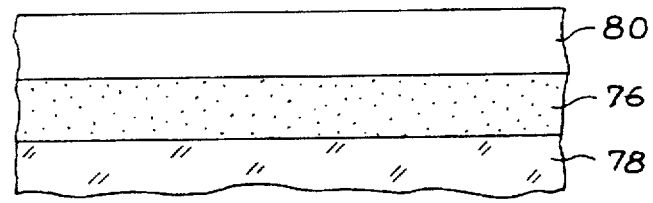
Figure 6C:
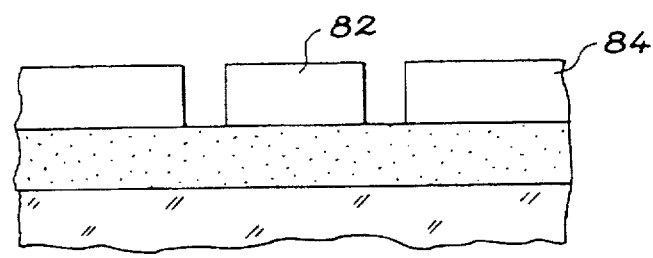
Figure 6D:
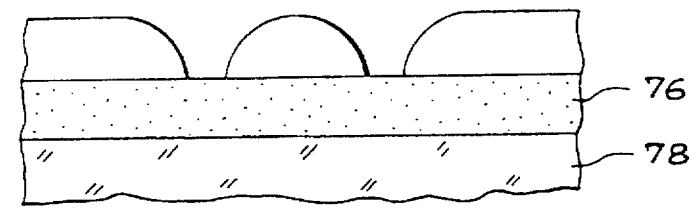
Figure 6E:
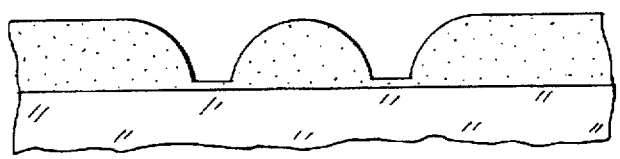

A process for the production of the microlens and the corresponding microbeams will now be described. Use will be made of the example of elements made from silica, the starting material 76 being previously deposited on a silicon substrate 76 (FIG. 6A). A resin layer 80 is then deposited on the silica layer (FIG. 6B). Using a conventional photolithography procedure, formation then takes place of photosensitive resin cylinders 82 on the surface of the substrate, as well as elements 84 having a shape corresponding to that of the microbeams which it is wished to produce. The assembly is then heated, the resin elements melt and are transformed, under the action of surface tensions, into spherical drops, which solidify with the same shape when the plate cools (cf. FIG. 6D). Alternatively, it is possible to carry out an exposure and a development of the photosensitive resin by a variable density mask procedure. A following stage (FIG. 6E) makes it possible to etch the microbeams and microlenses in the silica layer 76. For this stage it is possible to use reactive ionic etching (RIE), the gases (e.g. $CHF_3$ for silica and $O_2$ for resin) reacting with the materials to be etched in order to form volatile compounds, which are then evacuated by pumping. The control of the proportions of these gases makes it possible to choose the selectivity S of the etching, which is the ratio of the speeds of etching the substrate and the resin mask. It is therefore possible to correct the shape of the lenses in order to reduce or increase their radius of curvature.

Figure 6F:
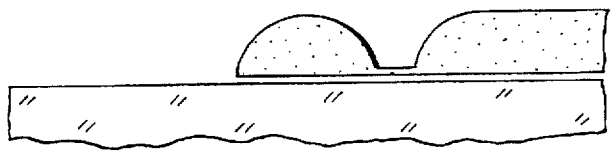

A subsequent stage (FIG. 6F) of isotropic etching the silicon layer 78 makes it possible to free the microlens-microbeam assembly, thus forming the microoptical component with the desired shape. This shape can be of a random nature and the procedure described hereinbefore makes it possible to obtain the already described components in conjunction with FIGS. 1A to 4, as well as any other beam structure, no matter what its shape. The electric contacts are obtained by evaporation under an oblique incidence through a mechanical mask.

Figure 7A:
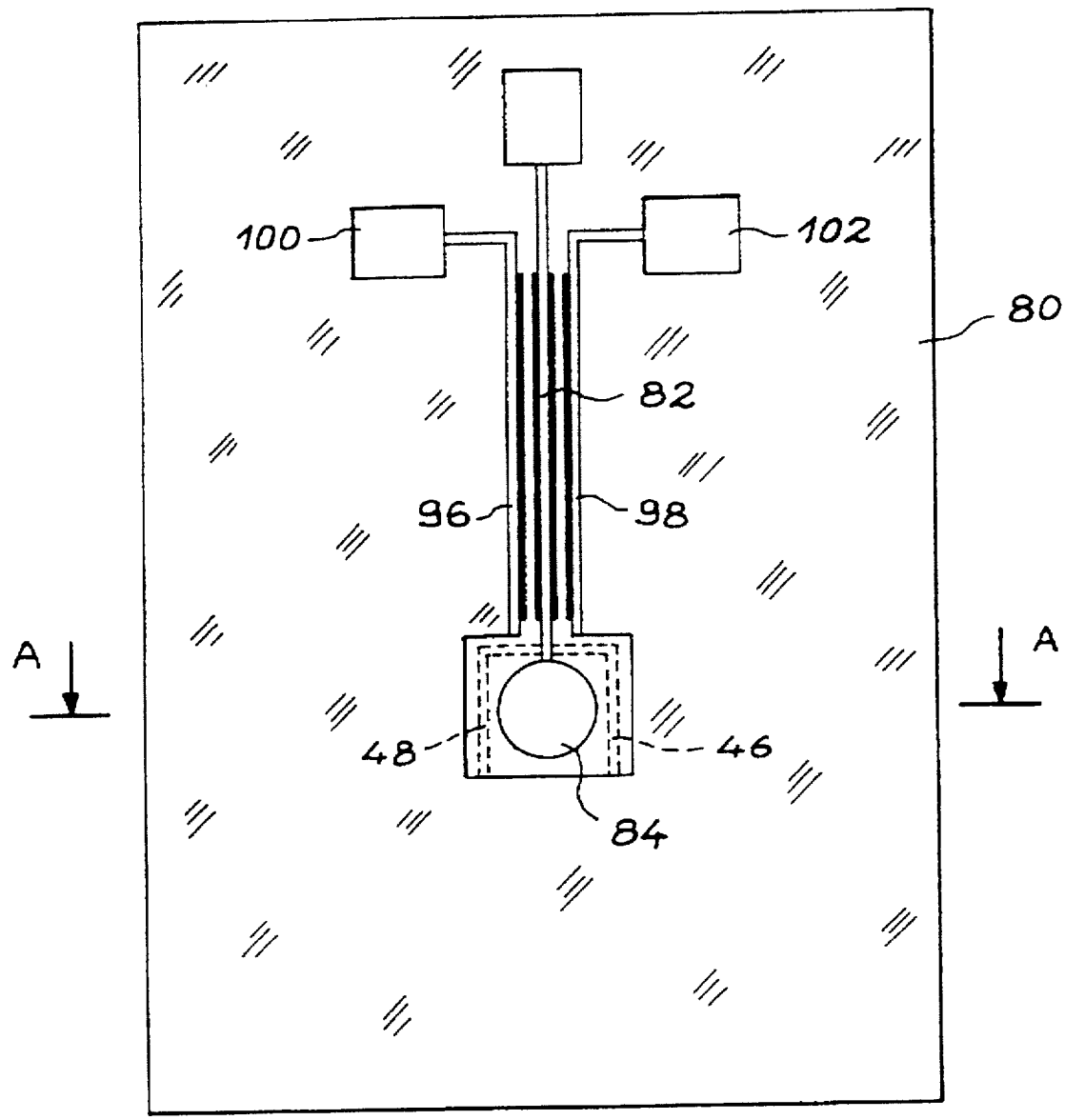
FIGS. 7A and 7B Respectively a plan view and a section AA of an optomechanical microdeflector according to the invention.

The use of a microoptical component constituted by a microlens and a microbeam will now be described in the case of an optomechanical microdeflector. Such a deflector is diagrammatically shown in FIGS. 7A (plan view) and 7B (side view in section along line A—A of FIG. 7A). In these drawings, the reference 80 designates an e.g. silica layer in which have been etched a microbeam 82 and a microlens 84, e.g. in accordance with the procedure described hereinbefore in conjunction with FIGS. 6A to 6F. When stabilization arms 46, 48 (FIG. 3) are used, one of their ends is connected to the beam 82, whilst the other end is connected to the fixed substrate 80.

The thickness of the layer 20 can e.g. be approximately 25 μm. It rests on an e.g. silicon substrate 86, whose thickness can be a few hundred micrometers, e.g. 500 μm. This substrate is anisotropically chemically etched so as to free an opening 88 permitting the propagation of a beam 90 from a radiation source. This source can be a laser source, e.g. a microlaser. The laser beam 90 can then propagate between the output face 92 of a microlaser 94 and the microlens 84. The position of the latter can e.g. be modified by an electrostatic control system if metallizations are deposited on either side of the microbeam 82. Each metallization is then associated with a corresponding metallization 96, 98 deposited on the fixed part of the silica layer. The metallizations 96, 98 are themselves connected to control electrodes 100, 102. Thus, in the plane of the substrate 80, such a system makes it possible to obtain a pendular oscillation of the assembly constituted by the microbeam and the microlens.

Figure 7B:
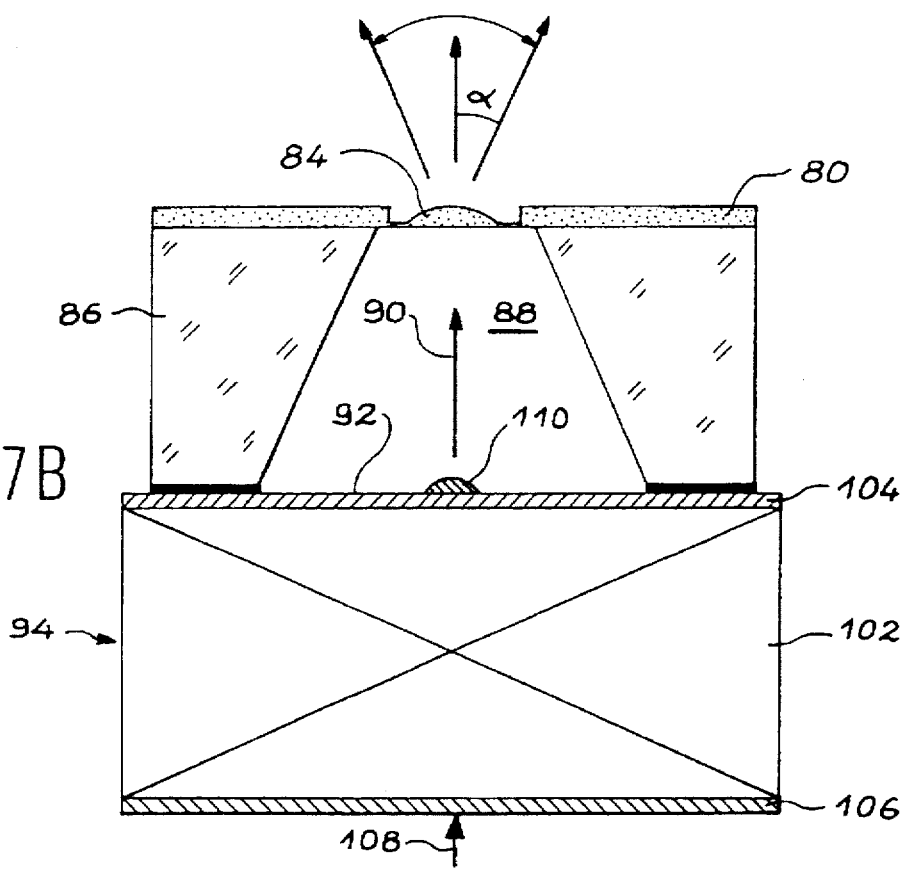

The microlaser 94 has a structure constituted by a stack of multilayers. The active laser medium 102 is constituted by a material of limited thickness (between 150 μm and 1 mm) and small dimensions (a few square millimeters), on which are directly deposited dielectric mirrors 104, 106, thus providing a microlaser cavity. The active medium 102 can be pumped by a III-V laser diode, which is either directly hybridized on the microlaser, or coupled to the latter by an optical fibre. The pumping beam is designated 108 in FIG. 7B. This type of microlaser has the possibility of mass production using microelectronics means at limited cost. A microlaser is e.g. described in the article by N. Mermilliod et al entitled "LaMgAl$_{11}$O$_{19}$:Nd microchip laser" published in Applied Physics Letters, vol. 59, No. 27, pp 3519–3520, 1991 or the article by J. J. Zayhowski entitled "Microchip lasers", published in The Lincoln Laboratory Journal, vol. 3, No. 3, pp 427–445, 1990. On the output mirror 104 is deposited a second microlens 110, which remains fixed with respect to the microlaser. The formation of this microlens involves procedures similar to those described hereinbefore for the production of the mobile microlens. A silica layer is previously deposited on a substrate constituted by the laser material and a resin layer is then deposited on the silica layer. By photolithography, a photosensitive resin cylinder is formed, which is then heated, melts and transformed, under the action of surface tensions, into a spherical droplet, which then solidifies on cooling. By ionic machining, the silica plate is subject to a bombardment of ions which progressively erodes its surface and finally only leaves behind the silica microlens.

The two microlenses are preferably arranged in such a way as to form an afocal system, the distance between said two lenses being determined so as to correspond to the thickness of the silicon substrate 86. According to an example, the fixed lens (deposited on the microlaser) has a focal distance $f_1=375$ μm, a diameter $\Phi_1=50$ μm, and a height $h_1=1.82$ μm, together with a radius of curvature $RC_1=172.5$ μm and an index $n=1.46$, whilst the mobile microlens has the characteristics given in column A of table I (the condition $f_1+f_2=L$ interlens distance being satisfied). For a displacement $\Delta=30$ um of the mobile microlens 84, a deflection of the output laser beam is obtained of: $\alpha=\text{arctg}(\Delta/f_2)\approx 12.5°$.

Figure 8:
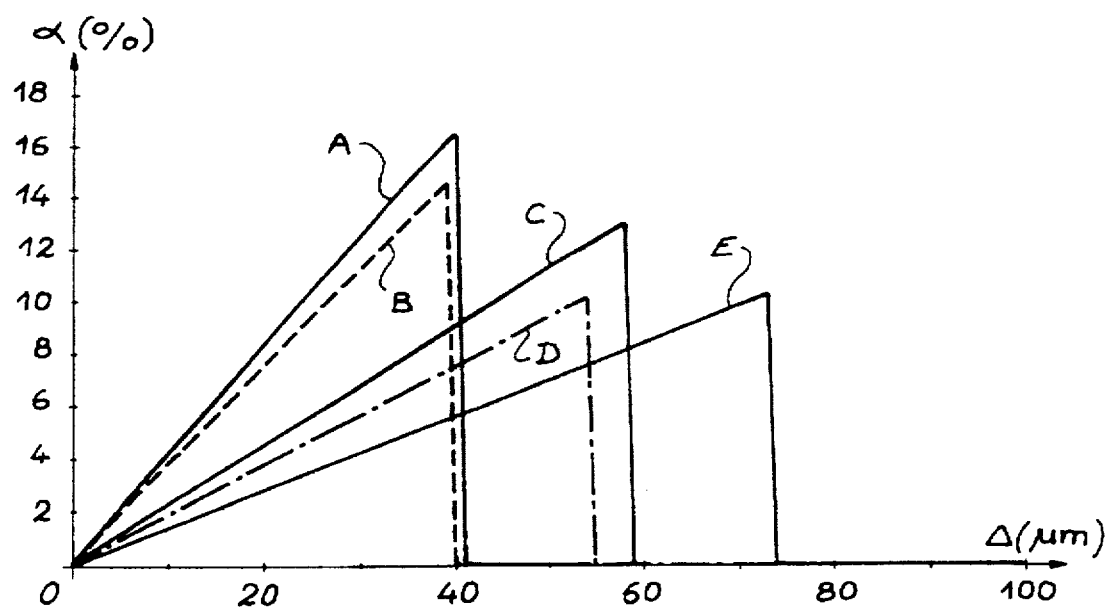
FIG. 8 An example of microlens deflection data.

Table I gives, in each of its columns, the characteristics of five mobile microlenses A, B, C, D and E. For each of the microlenses, the deflection angle (in degrees) is given in FIG. 8 as a function of the displacement $\Delta$ (in micrometers) (($\alpha=\text{arctg}(\Delta/f_2)$). Moreover, for $h<<\Phi_2$, we obtain $$\alpha\cdot f = \frac{\Phi_2^2}{8h(n-1)}$$

in which n is the index of the material from which the lens is formed.

The microdeflector described hereinbefore does not require the use of a piezoelectric element. Moreover, the apparatus obtained integrates the microlaser source and the total volume of the device is very small, because the distance between the input mirror 106 of the microlaser and the mobile microlens can be approximately 1.5 mm, for a surface of approximately 20 mm$_2$ (surface of the substrate 80, cf. FIG. 7A). The small size and low weight of the assembly of components makes them substantially insensitive to the environment which, as explained hereinbefore, is vital in the case of onboard laser microtelemeters. The microdeflector described hereinbefore only involves a single dimension microbeam deflection. The use of more complex arm systems, such as those illustrated in conjunction with FIGS. 2A and 2B, makes it possible to implement bidimensional scanning devices. It is also possible to stack two systems with a single scanning direction by a 90° intersection of two microbeams on two technology levels, each microbeam carrying at its end a microlens and can be controlled e.g. by an electrostatic control. Moreover, the implementation of an electrostatic comb associated with a microlens makes it possible to reduce the control voltages for a constant microlens displacement.

TABLE I

| Focal length $f_2$ (μm) | 135 | 150 | 250 | 300 | 400 |
|---|---|---|---|---|---|
| Diameter $\Phi_2$ (μm) | 100 | 100 | 150 | 150 | 200 |
| Index n | 1.46 | 1.46 | 1.46 | 1.46 | 1.46 |
| Radius of curvature (μm) | 62.10 | 69.00 | 115.00 | 138.00 | 184.00 |
| Thickness (μm) | 25.27 | 21.45 | 27.82 | 22.16 | 29.55 |
| $\Delta_{max}$ (μm) | 41.00 | 40.00 | 58.33 | 55.00 | 73.33 |
| $\alpha_{max}$ (μm) | 16.50 | 14.57 | 13.06 | 10.20 | 10.34 |

What is claimed is:

1. A monolithic microoptical component comprising a microlens having a focal axis and a microbeam directly fixed to said microlens, said microbeam extending along an axis substantially perpendicular to the focal axis of the microlens and configured to undergo elastic deformations along a deflection axis substantially perpendicular to both the focal axis of the microlens and to the axis along which the microbeam extends.

2. A monolithic microoptical component comprising a microlens having a focal axis and a microbeam having an end which is directly fixed to said microlens, said microbeam extending along an axis substantially perpendicular to the focal axis of the microlens, the geometrical parameters of the microbeam being such that the microbeam will undergo elastic deformations along a deflection axis substantially perpendicular to both the focal axis of the microlens and to the axis along which the microbeam extends.

3. The monolithic component according to claim 1 or 2 having means for the electrostatic control of the microbeam displacement.

4. The monolithic component according to either of the claims 1 or 2, also having microbeam stabilization means.

5. The monolithic component according to claim 4, wherein the stabilization means has at least one auxiliary arm.

6. The monolithic component according to either of the claims 1 and 2, also having at least one second microbeam extending along a second axis substantially perpendicular to the focal axis of the microlens.

7. The monolithic component according to claim 6, wherein the microlens is fixed to the ends of two microbeams.

8. The monolithic component according to claim 6, wherein one of the ends of the first microbeam is fixed to a second microbeam.

9. The monolithic component according to claim 6 having means for the electrostatic control of the displacement of a second microbeam.

10. The monolithic component according to one of the claims 1 or 2, wherein the microlens is connected to at least one electrostatic microcomb.

11. The monolithic component according to one of the claims 1 or 2, wherein the microlens is fixed to the ends of four microbeams, each microbeam being extended by an electrostatic microcomb.

12. The monolithic component according to claim 11, wherein each microbeam is connected to a transverse microbeam whose ends are themselves connected to a fixed substrate having notches in which are inserted the teeth of the microcombs.

13. The monolithic component according to claim 11, wherein each microbeam is connected to a transverse microbeam whose ends are themselves connected to fixed elements, a fixed substrate having notches in which are inserted the teeth of the microcombs.

14. The monolithic component according to claim 13, wherein the elements are electrically insulating, the microbeams and fixed substrate being conductive.

15. An optomechanical microdeflector comprising a pair of microlenses, one of said microlenses being mobile and forming part of a component according to one of the claims 1 or 2.

16. An optomechanical microdeflector according to claim 15, wherein the microlens and the component of which it forms part are obtained by etching a substrate in the plane of which said component is mobile.

17. An optomechanical microdeflector according to claim 15, further comprising a radiation source being a microlaser.

18. An optomechanical microdeflector according to claim 17, wherein said microlaser has a microcavity and one of the microlenses of the pair of microlenses is fixed to an output face of said microlaser cavity.

19. An optomechanical microdeflector according to claim 15, wherein the pair of microlenses are of the afocal type.

20. A monolithic microoptical component according to either of claims 1 or 2, wherein said microlens and said microbeam are made from a same material.

* * * * *